Figure 1:
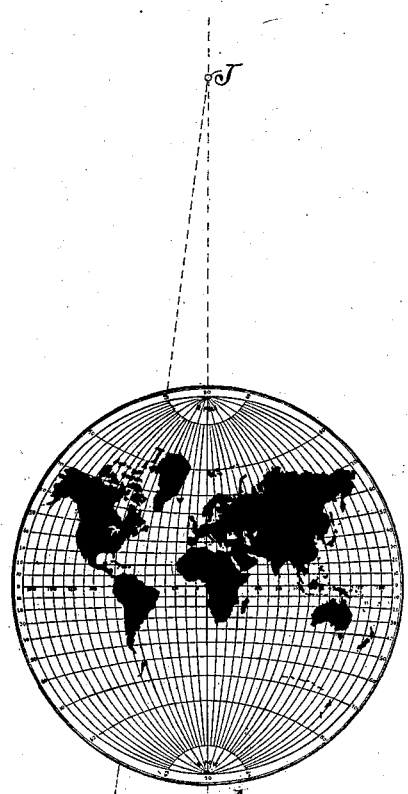

No. 751,226. PATENTED FEB. 2, 1904.
A. VAN DER GRINTEN.
MAP.
APPLICATION FILED OCT. 2, 1899.
NO MODEL.

Witnesses:-
Carl H. Crawford
C. W. Hills

Inventor:-
Alphons Van der Grinten
by Poole & Brown
his Attorneys

No. 751,226. Patented February 2, 1904.

UNITED STATES PATENT OFFICE.

ALPHONS VAN DER GRINTEN, OF CHICAGO, ILLINOIS.

MAP.

SPECIFICATION forming part of Letters Patent No. 751,226, dated February 2, 1904.

Application filed October 2, 1899. Serial No. 732,285. (No model.)

*To all whom it may concern:*

Be it known that I, ALPHONS VAN DER GRINTEN, of Chicago, in the county of Cook and State of Illinois, have invented certain new and useful Improvements in Maps; and I do hereby declare that the following is a full, clear, and exact description thereof, reference being had to the accompanying drawings, and to the characters of reference marked thereon, which form a part of this specification.

This invention relates to a new method of representing the whole world upon a plane surface of circular outline. In maps as heretofore constructed the parallels and meridians have been delineated on a circular plane surface; but two such planes have been required to represent the whole world—one for the Eastern and one for the Western Hemisphere. In such representation it has been difficult to convey to the mind, especially that of the young student, a proper idea of the relative location of the different parts of the world, and for this reason a map on a globe has largely come into use. Attempts have been made, however, to illustrate the entire world upon a single surface—such, for example, as the map projections introduced by Mercator and by Mollweide. The Mercator projection is upon a plane of rectangular form, the parallels and meridians being formed entirely of straight lines at right angles to each other. The Mercator chart was intended for navigators only and was not, strictly speaking, intended to represent the whole world, for the poles and the regions directly around them could not be shown upon it. Manifestly there was an appalling exaggeration in areas in the most northern and southern latitudes of the Mercator projection. The Mollweide projection was upon an elliptical plane and produced a distorted idea of the world, giving it a flat appearance. By reason of the elliptical shape of the plane there was a corresponding inaccuracy in the projection of the parallels and meridians.

By my invention I project the entire world upon a single circular plane by means of a network of parallels and meridians the construction of which is purely geometrical and by which the distortion of angles by the intersections of parallels and meridians is reduced to a minimum, so that not only may the nearest approach of the true forms of land and water be indicated on one plane, but also the polar regions may be delineated with a sufficient degree of accuracy.

My invention will be more fully understood by reference to the accompanying drawings and will be indicated by the claims appended hereto.

Figure 2:
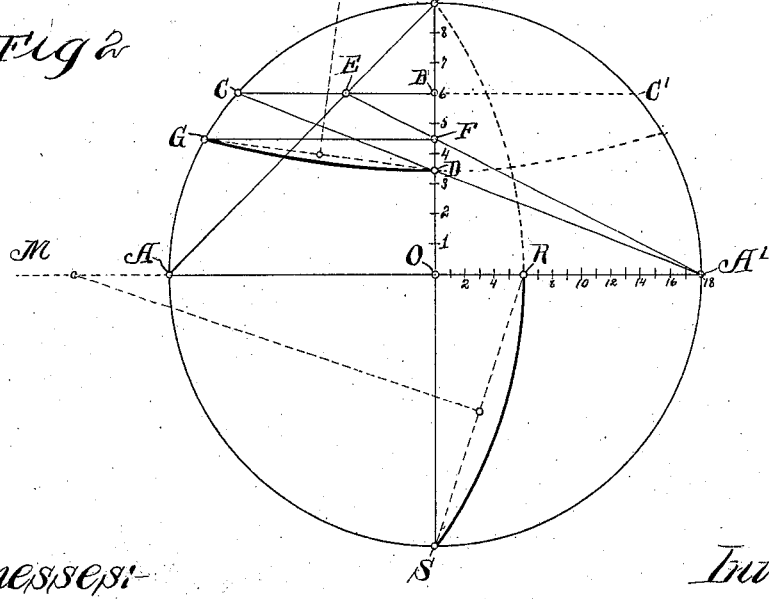

In said drawings, Figure 1 represents a circular projection constructed in accordance with the principles of my invention and containing therein a representation of the whole world. Fig. 2 is a diagrammatic view illustrating the geometrical method by which the network of the parallels and meridians may be accurately drawn upon a flat surface.

I shall now proceed to describe the method of projecting the network of parallels and meridians of the earths's surface upon a circular plane by means of said diagrammatic view Fig. 2. In doing this for the sake of clearness I have indicated the parallels and meridians in heavy black lines. I first draw a circle representing the marginal meridian inclosing an area equal to the surface of a sphere or globe of half the diameter of said circle, or, in other words, the said circle has twice the diameter of the given globe. I then form horizontal and vertical diameters thereon representing the equator and the central meridian, respectively. In said Fig. 2 the equator is indicated by the letters A O A' and the central meridian is indicated by the letters N O S. As the four quadrants of the circle thus formed are identical, this explanation will be sufficient if it is made with respect to two of the quadrants only—that is to say, it will be convenient to use only two of the quadrants to construct therein the arc of the network. For projecting a parallel of latitude—for instance, the sixtieth degree of north latitude—I first divide the line O A' into a number of parts equal to half the total number of meridians it is desired to show on the globe. I then divide the line O N into one-half as many equal parts as I have divided the line O A', numbering the parts on each line 1 2 3, &c., beginning with the first line from O. From 6 on the line O N, I draw a chord perpendicular thereto and at its intersection with the line O N apply the letter B and letter its points of intersection with the circumference or marginal line C C'. I then draw chord connecting the point C with the point A' and indicate the point of intersection of the said chord and the line O N by the letter D. The arc of the sixtieth parallel of latitude will intersect the central meridian or line O N at the point D. I then draw the chord A N intersecting the line B C at the point E. By connecting the point E by a straight line with the point A', I find an intersecting-point F on the line O N. The chord which subtends the required parallel—i. e., sixty degrees—intersects the line O N at the point F. I next draw the line F G, which is half of said chord, and from the point J on a prolongation of the line O N, I describe an arc passing through the points G and D. This arc, half of which is herein shown, will be the required or sixtieth parallel of latitude. In a similar manner the other parallels desired to be shown may be drawn. The meridian-lines are constructed by describing from centers, as M, on the line A' A produced a plurality of arcs each passing through the points N and S and respectively intersecting the line O A' at 1 2 3 4, &c., one-half of one of such arcs being shown by the heavy line S R.

By the use of my method as herein described, it will be observed that there are double the number of meridian-lines shown that there are of the parallels, so that if the parallels represent ninety degrees in each side of the equator, or a total of one hundred and eighty degrees, the meridian-lines will indicate three hundred and sixty degrees, or the entire surface of the earth. Upon the network of meridians and parallels the map is drawn, care being taken to correctly locate the parts of the same with reference to the said parallels and meridians.

It is obvious that as the parallels and meridians are formed exclusively of straight lines and circular arcs the construction is strictly geometrical. Inasmuch as the marginal meridian is a circle, it is the most natural representation of a spherical form. There is no alteration along the equator. Therefore the longitude on the map corresponds with the difference of time on the earth and all maximum alterations are concentrated at the poles. The distortion of angles formed by the intersection of meridians and parallels is minimal, thereby limiting the indefinite number of possible solutions to the one most advantageous and having the least possible increase of total error toward the poles. The area of the plane being equal to that of a globe of half the diameter, it follows that the map shown on said plane is essentially as it would appear on a map on said globe. As compared with Mercator's sea-chart and Mollweide's equivalent representations my system of projection is compensating, balancing the apalling increase of area in the former and the rapid decrease of the angle in the latter, thereby insuring the nearest approach to the true forms of land and water and manifesting its usefulness for all practical purposes.

I claim as my invention—

1. A map of the entire surface of the earth projected on a circular plane and formed by straight lines and circular arcs indicating the equator and parallels and the intersecting meridians and so arranged that the equator is intersected at intervals proportioned to the longitude or difference of time on the earth without causing any alteration of length, area or angle along the equator.

2. A map of the entire surface of the earth formed by straight lines and circular arcs indicating the equator and parallels and the intersecting meridians and so arranged that the equator is intersected at intervals proportioned to the longitude or difference of time on the earth without causing any alteration of length, area or angle along the equator, the meridinal parts between the parallels continuously increasing toward the poles in such manner that the rate of increase of area and the rate of decrease of angle formed by the intersection of parallels and meridians, are simultaneously minimized.

3. A map of the entire earth on a plane bounded by a circle, said plane having described thereon curved lines indicating parallels of latitude and other curved lines double the number of the parallels and intersecting the same, indicating meridians of longitude, said meridian-lines being numbered to indicate the three hundred and sixty degrees of the earth's circumference.

4. A map of the entire surface of the earth circumscribed by a circle and having intersecting curved meridians and parallels, said meridians and parallels being arranged to produce a minimal distortion of the landed parts of the earth's surface near the equator and to concentrate whatever distortion occurs at or near the poles.

In testimony that I claim the foregoing as my invention I affix my signature, in presence of two witnesses, this 25th day of September, A. D. 1899.

ALPHONS VAN DER GRINTEN.

Witnesses:
TAYLOR E. BROWN,
WILLIAM C. SCHAEFER.